United States Patent [19]

Kaneko

[11] Patent Number: 5,731,927
[45] Date of Patent: Mar. 24, 1998

[54] SPINDLE ASSEMBLY FOR A DISK DRIVE USING LESS THAN A FULL COMPLIMENT OF DISKS

[75] Inventor: Hisashi Kaneko, Kawasaki, Japan

[73] Assignee: Fujitsu Limited, Kawasaki, Japan

[21] Appl. No.: 747,307

[22] Filed: Nov. 12, 1996

[30] Foreign Application Priority Data

Jun. 11, 1996 [JP] Japan .................................. 8-148861

[51] Int. Cl.⁶ ...................................................... G11B 17/04
[52] U.S. Cl. ................................................... 360/98.08
[58] Field of Search ............................ 360/98.08, 99.12

[56] References Cited

U.S. PATENT DOCUMENTS 3,187,317  6/1965  Smith ................................. 360/98.08
4,224,648  9/1980  Roling ............................... 360/98.08

Primary Examiner—A. J. Heinz
Attorney, Agent, or Firm—Greer, Burns & Crain, Ltd.

[57] ABSTRACT

A spindle assembly for a disk drive uses fewer than the maximum number of disks, reducing power consumption of a spindle motor without reducing the dust collecting ability of an air filter. The spindle assembly includes a shaft adapted to be fixed to a housing of the disk drive, and a spindle hub rotatably mounted on the shaft. A first set of disks spaced from each other a given distance is mounted on a lower portion of the spindle hub, and a second set of disks spaced from each other the above given distance is mounted on an upper portion of the spindle hub. A dummy ring is mounted on an intermediate portion of the spindle hub to define a large space between the first set and the second set. The intermediate portion does not have disks. A clamp is secured to the spindle hub by screws, thereby fixing the first and second sets of disks to the spindle hub.

15 Claims, 5 Drawing Sheets

SPINDLE ASSEMBLY FOR A DISK DRIVE USING LESS THAN A FULL COMPLIMENT OF DISKS

BACKGROUND OF THE INVENTION

1. Field of the Invention

The present invention relates to a spindle assembly for a magnetic disk drive.

2. Description of the Related Art

In general, a usual magnetic disk drive is of a maximum-capacity type such that a maximum number of disks are accommodated in a housing having a standard external size to ensure a maximum storage capacity. In contrast with such a maximum-capacity type disk drive, development is frequently made on a small-capacity type disk drive having a reduced number of disks and heads to reduce the storage capacity. Usually, such a small-capacity type disk drive employs the same spindle motor and the same housing in external size as those of the maximum-capacity type disk drive. However, since the total height of the stacked disks is smaller than the total length of a spindle hub by an amount corresponding to a reduction in number of the disks, the difference is filled by a cylindrical dummy spacer or by stacked dummy disks, thus constructing a spindle assembly.

In general, a plurality of disks and annular spacers are alternately stacked from the flange side of the spindle hub, and the cylindrical dummy spacer or the dummy disks is/are stacked at the remaining portion of the spindle hub as mentioned above. However, in the case that the cylindrical dummy spacer is used, an air flow by rotation of the disks is not generated at the remaining portion of the spindle hub. Accordingly, the ability of an air filter for circulating and removing dust in the magnetic disk drive by using the air flow generated by rotation of the disks is largely reduced, causing a reduction in reliability of the magnetic disk drive. On the other hand, in the case that the dummy disks are used, the effect of reduction in power consumption of the spindle motor by the reduction in number of the disks as the principal merit of the small-capacity type disk drive cannot be obtained, and an extra cost for the dummy disks is required.

For the purposes of improvement in recording density and improvement in impact resistance of the magnetic disk drive, a plurality of disks in a stacked condition are mounted on the spindle hub, and a clamp ring is secured to an end surface of the spindle hub by screws to fix the disks to the spindle hub. At this time, the disk nearest to the clamp ring is influenced by tightening of the screws in such a manner that a portion of the disk in the vicinity of the screws is pressed by a large force, but a portion of the disk between the screws is pressed by a small force.

As a result, the disk is so deformed as to be undulated, causing a degradation in flying stability of the magnetic head, which adversely affects the improvement in recording density and the reliability of the disk drive. This defect is known in the art. The deformation of the disk due to screw tightening can be suppressed by reducing the tightening torque of the screws. In this case, however, a depression force to the disks is reduced to cause a problem such that when an external shock is received by any disk in its in-plane direction, the disk is slipped and therefore data cannot be properly recorded and reproduced. In particular, a recent small-sized magnetic disk drive is required to have a high impact resistance against about 100 G in an inoperative condition, so that the reduction in tightening torque of the screws to the clamp ring is not effective.

SUMMARY OF THE INVENTION

It is therefore an object of the present invention to provide a spindle assembly for a small-capacity type disk drive which can reduce the power consumption of a spindle motor without reducing the dust collecting ability of an air filter.

It is another object of the present invention to provide a spindle assembly for a small-capacity type disk drive which can prevent application of offset load to a pair of bearings.

It is still another object of the present invention to provide a spindle assembly for a small-capacity type disk drive which can prevent deformation of disks due to screw tightening to a clamp ring and ensure sufficient impact resistance.

In accordance with an aspect of the present invention, there is provided a spindle assembly for a disk drive having a housing consisting of a base and a cover fixed to the base, comprising a shaft adapted to be fixed to the housing; a stator coil fixed to the shaft; a spindle hub rotatably mounted on the shaft, the spindle hub having an upper portion, an intermediate portion, and a lower portion; a rotor magnet fixed to the intermediate portion of the spindle hub so as to be opposed to the stator coil; a pair of bearings for rotatably supporting the spindle hub at the upper portion and the lower portion of the spindle hub; a first set of disks spaced from each other a given distance and mounted on the lower portion of the spindle hub; a second set of disks spaced from each other the given distance and mounted on the upper portion of the spindle hub; a dummy ring mounted on the intermediate portion of the spindle hub and interposed between the uppermost disk of the first set of plural disks and the lowermost disk of the second set of plural disks, the dummy ring having an axial length two or more times the given distance; a clamp for pressing down the uppermost disk of the second set of plural disks; and a fixing means for fixing the clamp and the first and second sets of disks to the spindle hub.

The first set of disks and the second set of disks are separately mounted on the lower portion and the upper portion of the spindle hub, respectively, and the dummy ring is mounted on the intermediate portion of the spindle hub. Accordingly, an air flow coming into the air filter becomes a substantially laminar flow although a slight reduction in flow velocity occurs at the intermediate portion of the spindle hub. Further, since no dummy disks are used, an increase in power consumption of the spindle motor due to the use of dummy disks does not occur, which allows an improvement in reliability and a reduction in power consumption of the disk drive.

Preferably, the fixing means comprises a plurality of screws. The tightening torque of each screw to the clamp is set smaller than a normal value to temporarily fix the disks to the spindle hub. Thereafter, an adhesive is injected into an axial groove formed on the outer circumferential surface of the spindle hub to thereby finally fix the disks to the spindle hub by the adhesive.

In accordance with another aspect of the present invention, there is provided a spindle assembly for a disk drive having a housing consisting of a base and a cover fixed to the base, comprising a shaft adapted to be fixed to the housing; a stator coil fixed to the shaft; a spindle hub rotatably mounted on the shaft, the spindle hub having an upper half portion and a lower half portion; a pair of bearings for rotatably supporting the spindle hub at one of the upper half portion and the lower half portion of the spindle hub; a plurality of disks spaced from each other a given distance and mounted on either the upper half portion or the lower half portion of the spindle hub supported by the bearings; a rotor magnet fixed to either the upper half portion or the lower half portion of the spindle hub so as to be opposed to the stator coil; a dummy ring mounted on either the upper half portion or the lower half portion of the spindle hub, the dummy ring having an axial length two or more times the given distance; and a fixing means for fixing the plurality of disks to the spindle hub.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
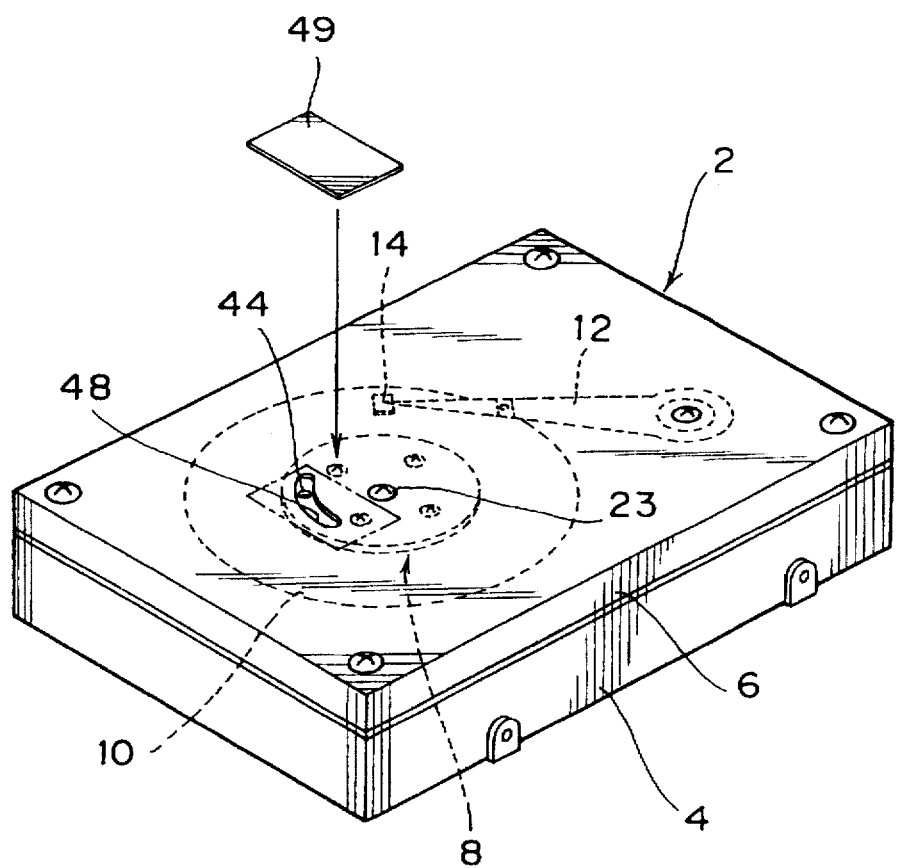
FIG. 1 is an external perspective view of a magnetic disk drive.

Referring to FIG. 1, there is shown an external perspective view of a magnetic disk drive. Reference numeral 2 denotes a housing (disk enclosure) composed of a base 4 and a cover 6 fixed to the base 4, and defining a sealed chamber therein. A spindle assembly 8 having a plurality of disks 10 is accommodated in the housing 2. Reference numeral 12 denotes a head actuator having a front end on which a head 14 for reading/writing data on each disk 10 is mounted.

Figure 2:
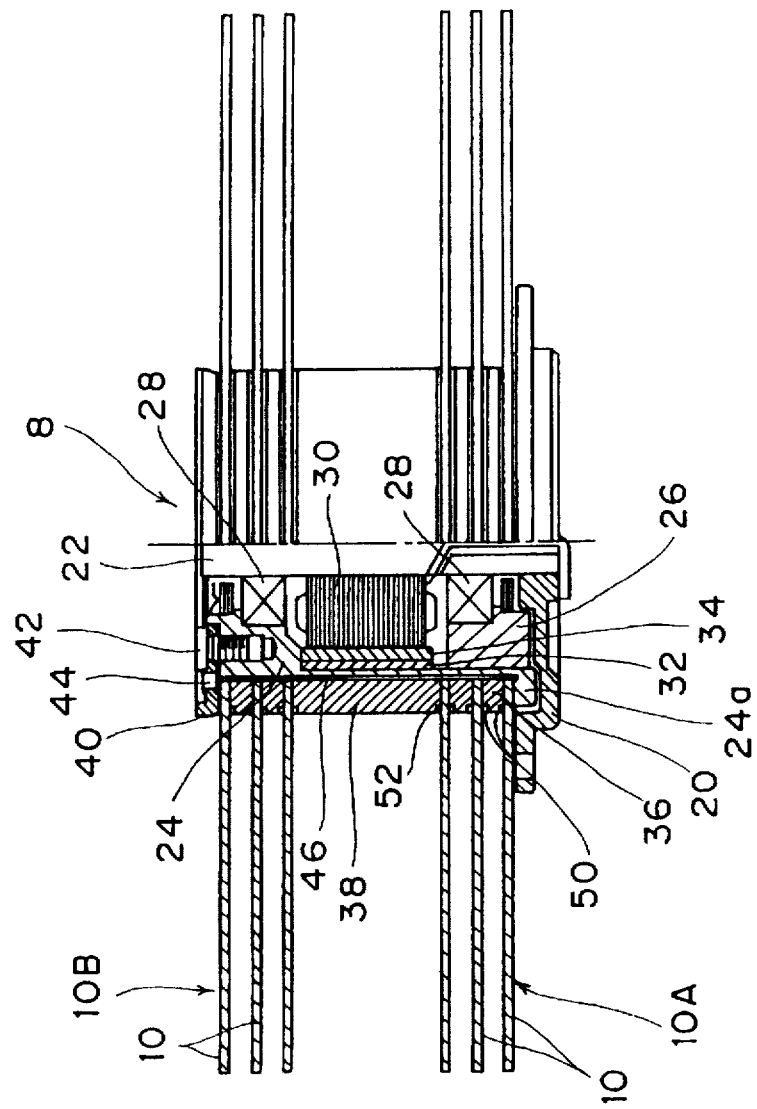
FIG. 2 is a partially sectional view of a first preferred embodiment of the present invention.

Referring to FIG. 2, there is shown a partially sectional view of the spindle assembly 8 according to a first preferred embodiment of the present invention. The spindle assembly 8 includes a flange 20 secured by screws to the base 4 of the disk drive. A shaft 22 is fixed at its lower end to the flange 20, and fixed at its upper end to the cover 6 by means of a screw 23 (see FIG. 1). A spindle hub 24 is rotatably mounted on the shaft 22 by a pair of bearings 28. An annular bushing 26 is fixed to the inside of a lower end portion of the spindle hub 24, and is rotatably supported by one of the bearings 28.

A stator coil 30 is mounted on an intermediate portion of the shaft 22. An annular rotor magnet 34 is fixed through an annular yoke 32 to an intermediate portion of the spindle hub 24. A gap having a given width is defined between the stator coil 30 and the rotor magnet 34. An annular flange 24a is formed integrally with the spindle hub 24 at its lower end portion. A first magnetic disk set 10A consisting of a plurality of magnetic disks 10 (three magnetic disks 10 in this preferred embodiment) is mounted on a lower portion of the spindle hub 24. The lowermost magnetic disk 10 is set on the annular flange 24a of the spindle hub 24, and all the disks 10 of the first set 10A are equally spaced by annular spacers 36 mounted on the lower portion of the spindle hub 24 so as to be alternately stacked.

A cylindrical dummy ring 38 instead of magnetic disks is mounted on an intermediate portion of the spindle hub 24. That is, the lower end surface of the cylindrical dummy ring 38 is set on the uppermost magnetic disk 10 of the first set 10A. Further, a second magnetic disk set 10B consisting of plural magnetic disks 10 (three magnetic disks 10 in this preferred embodiment) is mounted on an upper portion of the spindle hub 24. The lowermost magnetic disk 10 of the second set 10B is set on the upper end surface of the cylindrical dummy ring 38, and all the disks 10 of the second set 10B are equally spaced by annular spacers 36 mounted on the upper portion of the spindle hub 24 so as to be alternately stacked. In this manner, all the magnetic disks 10 of the first set 10A are spaced from each other a given distance defined by each annular spacer 36 mounted on the lower portion of the spindle hub 24, and all the magnetic disks 10 of the second set 10B are spaced from each other the above given distance defined by each annular spacer 36 mounted on the upper portion of the spindle hub 24.

The axial length of the cylindrical dummy ring 38 is set two or more times the axial length of each annular spacer 36 (i.e., the above given distance). A clamp ring 40 is set on the uppermost magnetic disk 10 of the second set 10B, and is secured to the spindle hub 24 by a plurality of screws 42, thereby fixing the first set 10A and the second set 10B to the lower portion and the upper portion of the spindle hub 24, respectively.

Figure 3:
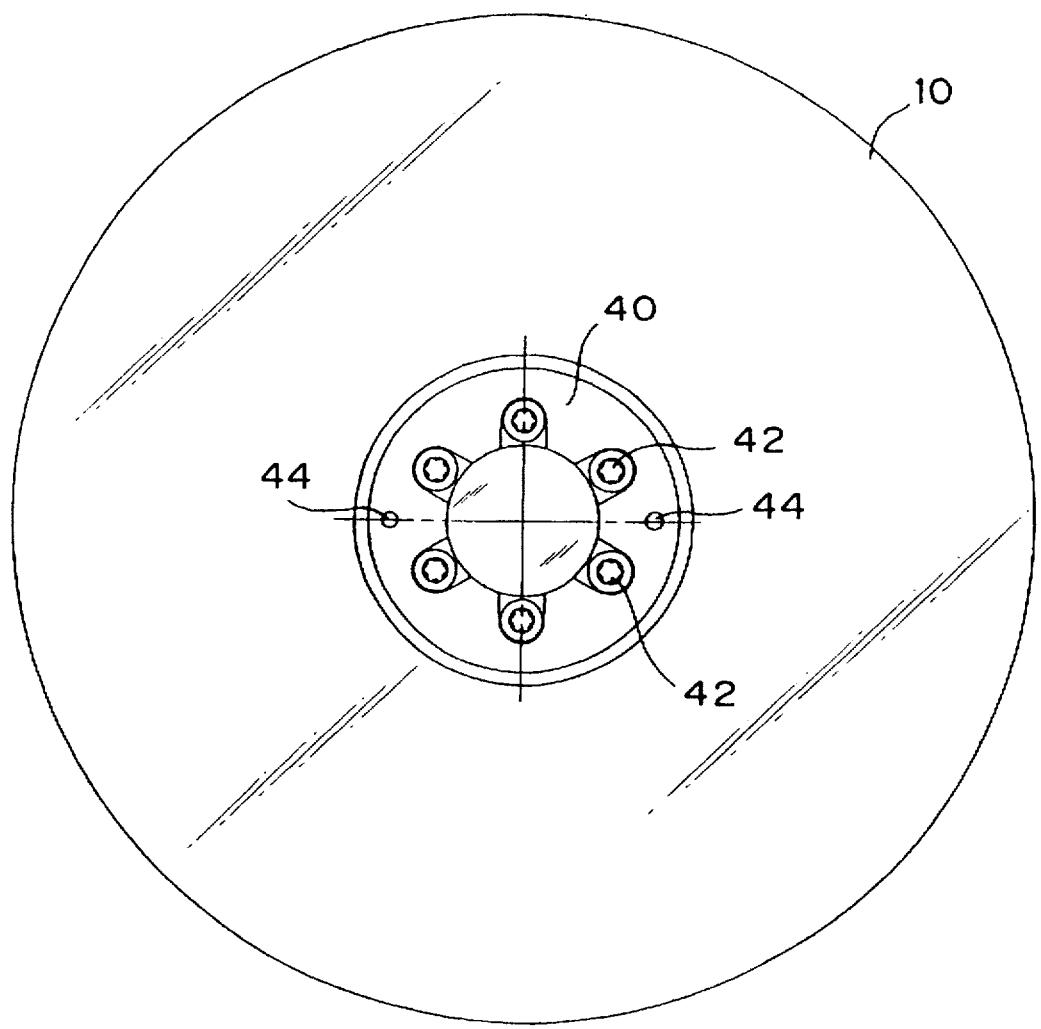
FIG. 3 is a plan view of the first preferred embodiment.

In this preferred embodiment, the tightening torque of each screw 42 to the clamp ring 40 is set smaller than a normal value, and each disk 10 is temporarily fixed by tightening the screws 42 to such an extent that each disk 10 comes to close contact with the adjacent annular spacers 36 to ensure a proper disk spacing. As shown in FIG. 3, the clamp ring 40 is formed with two adhesive injecting holes 44. As shown in FIG. 2, two axial grooves 46 (one of which is shown) are formed on the outer circumferential surface of the spindle hub 24 so as to be respectively aligned to the two adhesive injecting holes 44 of the clamp ring 40.

After temporarily fixing the magnetic disks 10 by tightening the screws 42 as mentioned above, an adhesive is injected through the holes 4 into the grooves 46 to thereby finally fix the magnetic disks 10 to the spindle hub 24 by the adhesive. Accordingly, each magnetic disk 10 is firmly fixed to the spindle hub 24, so that even if an external shock is received by any disk 10 in its in-plane direction, there is no possibility of slip of the disk 10. As described above, the tightening torque of each screw 42 to the clamp ring 40 is set smaller than the normal value, and all the magnetic disks 10 are bonded to the spindle hub 24 by the adhesive injected into the grooves 46. Accordingly, deformation of each disk 10, especially, the uppermost disk 10, can be prevented, and sufficient impact resistance can also be ensured.

In the magnetic disk drive manufactured by fixing the magnetic disks 10 to the spindle hub 24 by the adhesive as mentioned above, there is a possibility that when a defect on any disk 10 is found in delivery inspection of the disk drive, it may be difficult to replace and repair the defective disk. To cope with this, the magnetic disks 10 are temporarily fixed by the screws 42 until the delivery inspection is finished. Further, as shown in FIG. 1, the cover 6 is formed with a hole 48 for exposing the adhesive injecting hole 44 (actually, two holes 48 are formed so as to respectively correspond to the two adhesive injecting holes 44).

After finishing the delivery inspection, the adhesive is injected through the hole 48 of the cover 6 to the corresponding adhesive injecting hole 44, thereby firmly fixing the magnetic disks 10 to the spindle hub 24. After injecting the adhesive, the hole 48 of the cover 6 is closed by a seal 49 as shown in FIG. 1. The adhesive must have a relatively good fluidity, so as to securely bond all the disks 10 to the spindle hub 24. However, there is a possibility that when such a well-fluidic adhesive is injected, it may flow from between each disk 10 and the adjacent annular spacer 36 to the disk surface.

To cope with this, a pair of annular grooves are formed on the outer circumferential surface of each annular spacer 36 so as to be exposed to the upper and lower surfaces of the annular spacer 36, and each annular groove is lined with a seal member 50. Similarly, a pair of annular grooves are formed on the outer circumferential surface of the dummy ring 38 so as to be exposed to the upper and lower surfaces of the dummy ring 38, and each annular groove is lined with a seal member 52. The seal members 50 and 52 come to close contact with the disk surfaces, thereby preventing the flow of the adhesive to the disk surfaces. Although not shown, by similarly providing a seal member at a given position on the clamp ring 40, the flow of the adhesive to the disk surface of the uppermost disk 10 can be prevented.

According to this preferred embodiment, the first set of plural magnetic disks 10 and the second set of plural magnetic disks 10 are separately mounted on the lower portion and the upper portion of the spindle hub 24, respectively, and the dummy ring 38 is mounted on the intermediate portion of the spindle hub 24. Accordingly, an air flow coming into an air filter provided in the magnetic disk drive becomes a substantially laminar flow although a slight reduction in flow velocity occurs at the intermediate portion of the spindle hub 24. Therefore, a large reduction in dust collecting effect by the air filter can be prevented. Furthermore, since no dummy disks are used, an increase in power consumption of the spindle motor due to the use of dummy disks does not occur. Thus, the reliability of the small-capacity type magnetic disk drive can be improved.

Figure 4:
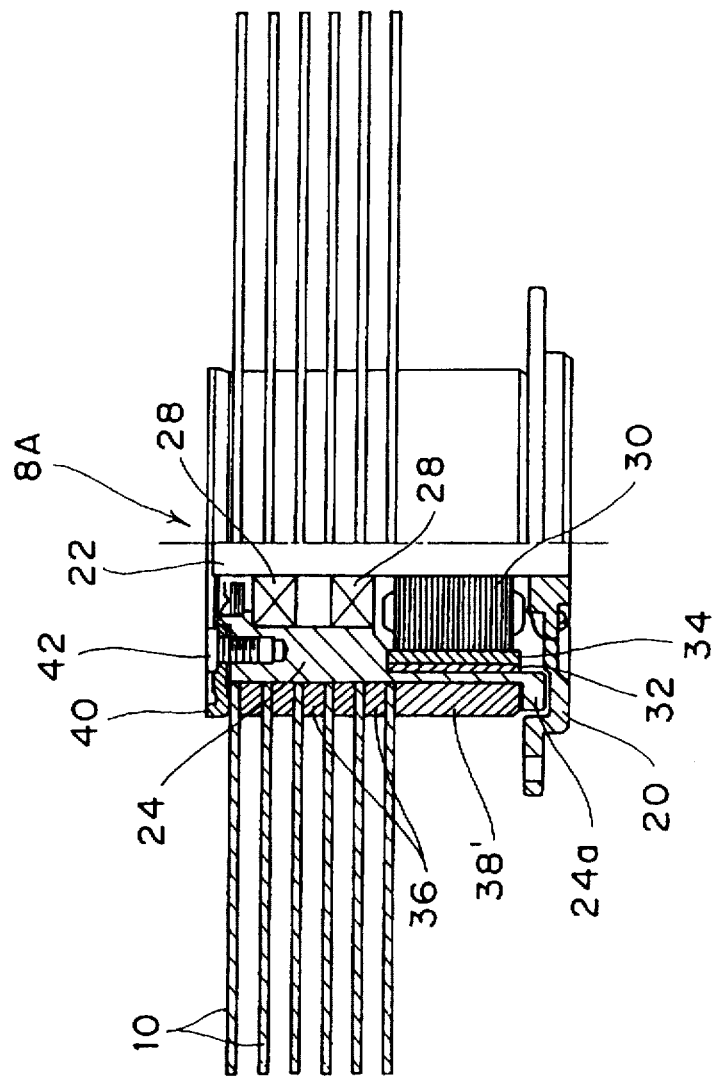
FIG. 4 is a partially sectional view of a second preferred embodiment of the present invention.

Referring to FIG. 4, there is shown a partially sectional view of a spindle assembly 8A according to a second preferred embodiment of the present invention. In the description of this preferred embodiment, substantially the same parts as those of the first preferred embodiment are denoted by the same reference numerals, and the description thereof will be omitted herein to avoid repetition. In the spindle assembly 8A according to the second preferred embodiment, a plurality of magnetic disks 10 equally spaced from each other are mounted on only an upper half portion of a spindle hub 24. The spindle hub 24 is rotatably supported at its upper half portion by a pair of bearings 28. A dummy ring 38' instead of disks is mounted on a lower half portion of the spindle hub 24. A stator coil 30 is fixed to a lower portion of a shaft 22, and an annular magnet 34 opposed to the stator coil 30 is mounted through a yoke 32 on a lower portion of the spindle hub 24.

According to this preferred embodiment, the plurality of magnetic disks 10 are mounted on the upper half portion of the spindle hub 24 supported by the pair of bearings 28. Accordingly, a load is substantially uniformly applied to the pair of bearings 28. Therefore, even in the small-capacity type magnetic disk drive configured by mounting the magnetic disks 10 on only a part of the spindle hub 24, there is no possibility that when an external force is received by any disk 10, the disk 10 may be inclined because of offset load to the bearings. Thus, the reliability of the small-capacity type magnetic disk drive can be improved.

Although not shown, like the first preferred embodiment, adhesive injecting holes may be formed through a clamp ring 40, and axial grooves communicating with the adhesive injecting holes may be formed on the outer circumferential surface of the spindle hub 24 in the spindle assembly 8A according to the second preferred embodiment. In this case, after temporarily fixing the disks 10 by screws 42, an adhesive is injected into the axial grooves to finally fix the disks 10 to the spindle hub 24 by the adhesive. Accordingly, deformation of the uppermost disk 10 due to tightening of the screws 42 to the clamp ring 40 can be effectively prevented.

Figure 5:
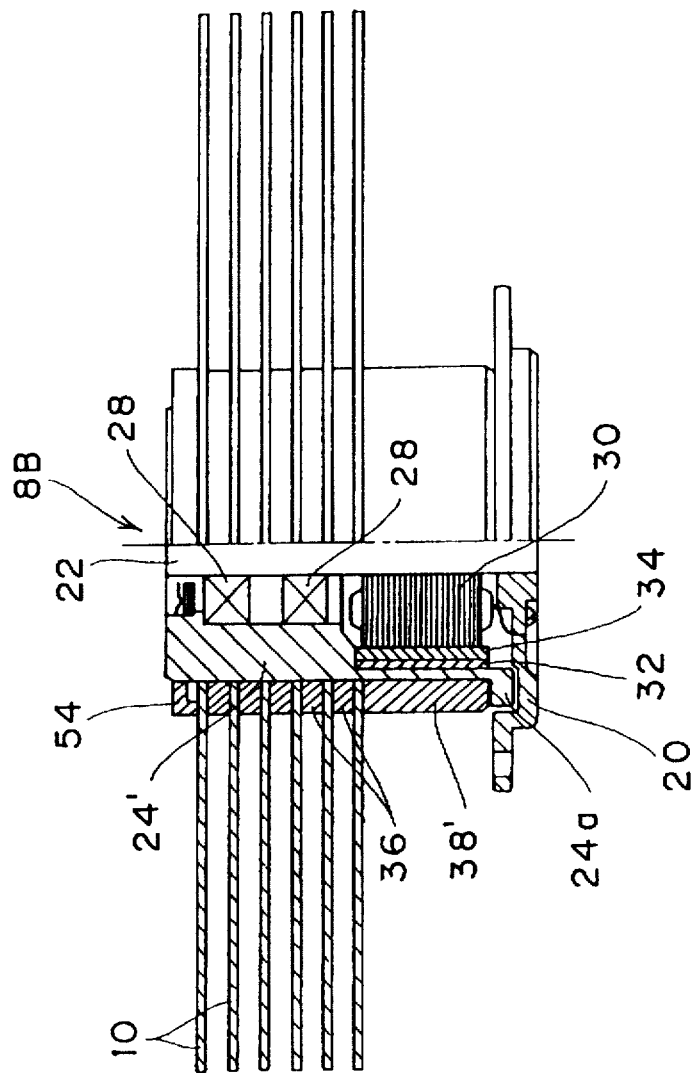
FIG. 5 is a partially sectional view of a third preferred embodiment of the present invention.

Referring to FIG. 5, there is shown a partially sectional view of a spindle assembly 8B according to a third preferred embodiment of the present invention. In the description of this preferred embodiment, substantially the same parts as those of the first and second preferred embodiments are denoted by the same reference numerals, and the description thereof will be omitted to avoid repetition. In the spindle assembly 8B according to the third preferred embodiment, an annular clamp 54 is fixed to an upper end portion of a spindle hub 24' by using shrink fit rather than screw tightening. Like the second preferred embodiment, the spindle hub 24' is supported at its upper half portion by a pair of bearings 28, and a plurality of magnetic disks 10 are mounted on only the upper half portion of the spindle hub 24'.

More specifically, the inner diameter of the annular clamp 54 is set slightly smaller than the diameter of the spindle hub 24' at room temperature. After alternately stacking the disks 10 and annular spacers 36 and mounting them together on the upper half portion of the spindle hub 24', the annular clamp 54, heated to a given temperature in a furnace or the like, is mounted on the upper end portion of the spindle hub 24' to press down each disk 10. Since the inner diameter of the annular clamp 54 is made larger than the diameter of the spindle hub 24' by heating, the annular clamp 54 can be easily mounted on the spindle hub 24'. Further, since the inner diameter of the annular clamp 54 is reduced when cooled to room temperature, the annular clamp 54 can be firmly fixed to the upper end portion of the spindle hub 24'.

Although not shown, like the first preferred embodiment, bonding of the magnetic disks 10 by the injection of an adhesive may be applied in addition to the shrink fit of the annular clamp 54. Further, instead of the shrink fit of the annular clamp 54, press fit of the annular clamp 54 may be used to fix the annular clamp 54 to the upper end portion of the spindle hub 24'. In this case, the inner diameter of the annular clamp 54 is set equal to or slightly larger than the diameter of the spindle hub 24', and the annular clamp 54 is press-fitted to the spindle hub 24' by using a jig.

In the case of press fit, the process can be simplified as compared with shrink fit, and a furnace or the like for shrink fit is not necessary. However, in the case of press fit, the fixation of each magnetic disk 10 to the spindle hub 24' is insufficient, so that it is necessary to additionally apply bonding of each magnetic disk 10 to the spindle hub 24' by the injection of an adhesive as described in the first preferred embodiment. While the plurality of magnetic disks are mounted on only the upper half portion of the spindle hub in the second and third preferred embodiments, they may be mounted on only the lower half portion of the spindle hub. In this case, the dummy ring is mounted on the upper half portion of the spindle hub.

According to the present invention, it is possible to provide a spindle assembly for a small-capacity type disk drive which can reduce the power consumption of the spindle motor without reducing the dust collecting ability of the air filter. Further, it is possible to provide a spindle assembly for a small-capacity type disk drive which can prevent deformation of the disks due to screw tightening to the clamp ring and ensure sufficient impact resistance.

What is claimed is:

1. A spindle assembly for a disk drive having a housing consisting of a base and a cover fixed to said base, comprising:
   a shaft adapted to be fixed to said housing;
   a stator coil fixed to said shaft;
   a spindle hub rotatably mounted on said shaft, said spindle hub having an upper portion, an intermediate portion, and a lower portion;
   a rotor magnet fixed to said intermediate portion of said spindle hub so as to be opposed to said stator coil;
   a pair of bearings for rotatably supporting said spindle hub at said upper portion and said lower portion of said spindle hub;
   a first set of disks spaced from each other a given distance and mounted on said lower portion of said spindle hub;
   a second set of disks spaced from each other said given distance and mounted on said upper portion of said spindle hub;
   a dummy ring mounted on said intermediate portion of said spindle hub and interposed between the uppermost disk of said first set of disks and the lowermost disk of said second set of disks, said dummy ring having an axial length two or more times said given distance;
   a clamp for pressing down the uppermost disk of said second set of disks; and
   a fixing means for fixing said clamp and said first and second sets of disks to said spindle hub.

2. A spindle assembly according to claim 1, wherein said fixing means comprises a plurality of screws for securing said clamp to said spindle hub.

3. A spindle assembly according to claim 2, wherein said fixing means further comprises an adhesive injecting hole formed through said clamp, an axial groove formed on an outer circumferential surface of said spindle hub so as to communicate with said adhesive injecting hole, and an adhesive injected through said adhesive injecting hole into said axial groove.

4. A spindle assembly according to claim 3, further comprising a plurality of annular spacers each interposed between adjacent disks of each of said first and second sets of disks;
   each of said annular spacers having on its outer circumferential surface a pair of annular grooves respectively exposed to an upper surface and a lower surface of each annular spacer;
   said dummy ring having on its outer circumferential surface a pair of annular grooves respectively exposed to an upper surface and a lower surface of said dummy ring; and
   a seal member mounted in each of said annular grooves of said annular spacers and said dummy ring.

5. A spindle assembly according to claim 1, wherein said clamp is an annular clamp, and said fixing means comprises a shrink fit for shrink-fitting said annular clamp to said spindle hub.

6. A spindle assembly according to claim 5, wherein said fixing means further comprises an axial groove formed on an outer circumferential surface of said spindle hub, and an adhesive injected in said axial groove.

7. A spindle assembly according to claim 1, wherein said clamp is an annular clamp, and said fixing means comprises a press fit for press-fitting said annular clamp to said spindle hub.

8. A spindle assembly according to claim 7, wherein said fixing means further comprises an axial groove formed on an outer circumferential surface of said spindle hub, and an adhesive injected in said axial groove.

9. A spindle assembly for a disk drive having a housing consisting of a base and cover fixed to said base, comprising:
   a shaft adapted to be fixed to said housing;
   a stator coil fixed to said shaft;
   a spindle hub rotatably mounted on said shaft, said spindle hub having an upper half portion and a lower half portion;
   a pair of bearings for rotatably supporting said spindle hub at one of said upper half portion and said lower half portion of said spindle hub;
   a plurality of disks spaced from each other a given distance and mounted on either said upper half portion or said lower half portion of said spindle hub supported by said bearings;
   a rotor magnet fixed to either of said upper half portion or said lower half portion of said spindle hub so as to be opposed to said stator coil;
   a dummy ring mounted on either said upper half portion or said lower half portion of said spindle hub, said dummy ring having an axial length two or more times said given distance; and
   a fixing means for fixing said plurality of disks to said spindle hub.

10. A spindle assembly according to claim 9, wherein said fixing means comprises:
    a clamp for pressing down the uppermost disk of said plurality of disks and said dummy ring; and
    a plurality of screws for securing said clamp to said spindle hub.

11. A spindle assembly according to claim 10, wherein said fixing means further comprises an adhesive injecting hole formed through said clamp, an axial groove formed on an outer circumferential surface of said spindle hub so as to communicate with said adhesive injecting hole, and an adhesive injected through said adhesive injecting hole into said axial groove.

12. A spindle assembly according to claim 11, further comprising a plurality of annular spacers each interposed between adjacent disks of said plurality of disks;
    each of said annular spacers having on its outer circumferential surface a pair of annular grooves respectively exposed to an upper surface and a lower surface of each annular spacer;
    said dummy ring having on its outer circumferential surface a pair of annular grooves respectively exposed to an upper surface and a lower surface of said dummy ring; and
    a seal member mounted in each of said annular grooves of said annular spacers and said dummy ring.

13. A spindle assembly according to claim 9, wherein said fixing means comprises an annular clamp fixed to said spindle hub by shrink fit.

14. A spindle assembly according to claim 9, wherein said fixing means comprises an annular clamp fixed to said spindle hub by press fit.

15. A spindle assembly according to claim 14, wherein said fixing means further comprises an axial groove formed on an outer circumferential surface of said spindle hub, and an adhesive injected in said axial groove.

* * * * *